(12) United States Patent
Taniguchi

(10) Patent No.: US 8,075,296 B2
(45) Date of Patent: Dec. 13, 2011

(54) INJECTION MOLDING MACHINE

(75) Inventor: Yoshiya Taniguchi, Akashi (JP)

(73) Assignee: Toyo Machinery & Metal Co., Ltd., Akashi-shi (JP)

( * ) Notice: Subject to any disclaimer, the term of this patent is extended or adjusted under 35 U.S.C. 154(b) by 28 days.

(21) Appl. No.: 12/674,288

(22) PCT Filed: Aug. 21, 2008

(86) PCT No.: PCT/JP2008/064917
§ 371 (c)(1),
(2), (4) Date: Feb. 19, 2010

(87) PCT Pub. No.: WO2009/025322
PCT Pub. Date: Feb. 26, 2009

(65) Prior Publication Data
US 2011/0159133 A1 Jun. 30, 2011

(30) Foreign Application Priority Data
Aug. 22, 2007 (JP) ................................. 2007-216007

(51) Int. Cl.
*B29C 45/18* (2006.01)
(52) U.S. Cl. ........................................ 425/145; 425/149
(58) Field of Classification Search .................. 425/145, 425/149, 150
See application file for complete search history.

(56) References Cited

U.S. PATENT DOCUMENTS

| 5,891,485 | A | * | 4/1999 | Emoto | 425/145 |
| 6,517,336 | B1 | | 2/2003 | Emoto et al. | |
| 6,533,572 | B1 | * | 3/2003 | Koide | 425/587 |
| 7,114,940 | B2 | * | 10/2006 | Ickinger et al. | 425/145 |
| 7,270,523 | B2 | * | 9/2007 | Schmidt | 425/145 |

FOREIGN PATENT DOCUMENTS

| JP | 61-266218 A | 11/1986 |
| JP | 8-39631 A | 2/1996 |
| JP | 10-235696 A | 9/1998 |
| JP | 11-198199 A | 7/1999 |

OTHER PUBLICATIONS

International Search Report dated Nov. 4, 2008 with English translation (four (4) pages).

* cited by examiner

*Primary Examiner* — Timothy Heitbrink
(74) *Attorney, Agent, or Firm* — Crowell & Moring LLP

(57) ABSTRACT

Provided is an injection molding machine using a built-in type motor as a measuring electric servomotor. In order to reduce the entire length of the machine (the injection molding machine), the metering electric motor is exemplified by a hollow built-in type motor, which includes a cylindrical stator, and a cylindrical rotor positioned in the stator. A sleeve is fixed in the rotor of the built-in type motor, and a member fixing the rear end portion of a screw and the sleeve are connected/fixed. Moreover, a nut member as a straight portion of a ball screw mechanism for converting the rotation of an injecting electric motor into linear motions and the sleeve are connected/fixed.

3 Claims, 5 Drawing Sheets

INJECTION MOLDING MACHINE

TECHNICAL FIELD

The present invention relates to an in-line screw type injection molding machine of an electrically driven type, and particularly relates to an injection molding machine using a built-in type motor as a metering electric servomotor.

BACKGROUND ART

For example, many in-line screw type injection molding machines of electrically driven types according to the background art use the following configuration. That is, a timing belt is extended between a driving pulley fixed to an output shaft of a metering electric motor and a driven pulley formed integrally with or fixed to a rotary connector to which a base end portion of a screw is fixed. Rotation of the metering electric motor is transmitted through a rotation transmitting mechanism constituted by the pulleys and the belt to the rotary connector retained rotatably on a linear motion block to be driven linearly by a driving force of an injecting electric motor. Thus, the screw integrated with the rotary connector can be rotated. When such a configuration is used, a general AC servomotor having an output shaft in its center can be used as the metering electric motor. However, a reduction mechanism has to be built by the rotation transmitting mechanism constituted by the pulleys and the belt. Thus, the number of parts increases to hinder space saving of the machine. In addition, since it is necessary to rotate the driven pulley whose diameter is comparatively large, the rotational inertia increases to limit the improvement of the transient response performance of rotation transmission unavoidably.

An injection molding machine using an internally hollow built-in type motor (direct coupling type motor) as the metering electric motor in order to reduce the rotational inertia to thereby improve the transient response performance of rotation transmission has been known, for example, in JP-A-08-039631 (Patent Document 1). The background-art technique in Patent Document 1 discloses a configuration in which a spline shaft formed integrally with a screw is spline-connected directly to a rotor of a built-in type motor as a metering electric servomotor so as to make the built-in type motor drive and rotate the screw. According to the invention proposed in Patent Document 1, there is provided a single built-in type motor serving as both a metering electric motor and an injecting electric servomotor, in which a ball screw or a spline shaft portion of a ball screw/spline shaft unit integrated with the screw is alternatively selected and rotated by a clutch so that the screw can be alternatively selectively rotated or moved linearly.

In the background-art technique in Patent Document 1, however, the ball screw is formed behind the screw and the spline shaft is formed behind the ball screw, so that the entire length of the machine becomes long. In addition, since the spline shaft is spline-connected to the rotor of the built-in type motor, constituent elements for the spline connection are required to thereby result in labor increase for the attachment.

According to the invention proposed in Patent Document 1, a single built-in type motor serves as both the metering electric motor and the injecting electric servomotor. It is therefore necessary to provide two clutches and a spline shaft connection mechanism. Thus, there is a problem that the structure is complicated and the assembly is troublesome. In addition, while the screw is rotated, axial pressure cannot be applied to the screw by the motor. Thus, there is another problem that back pressure cannot be applied in a metering step.

In an injection molding machine using a built-in type motor as a metering electric servomotor, it can be therefore regarded as rational that a rotary connector fixing and holding a base end portion of a screw is fixed to a cylindrical rotor rotating inside a cylindrical stator so as to transmit rotation of the metering built-in type motor directly to the screw and to thereby rotate the screw. In addition, it can be regarded as general that a linear motion portion of a ball screw mechanism for converting rotation of an injecting electric motor into linear motion is connected and fixed to a linear motion block which is mounted with the metering built-in type motor and which moves forward/backward, so that the linear motion block is driven linearly by the driving force of the injecting electric motor to thereby move the screw linearly.

Patent Document 1: JP-A-08-039631

DISCLOSURE OF THE INVENTION

Problem that the Invention is to Solve

As described above, the transient response performance at the time of starting up of screw rotation when metering is started can be enhanced by use of a built-in type motor as a metering electric motor. In addition, in the configuration where the linear motion portion of the ball screw mechanism is connected and fixed to the linear motion block which is mounted with the metering built-in type motor and which moves forward/backward, the linear motion portion of the ball screw mechanism does not rotate. It is therefore easy to control back pressure by the injecting electric motor in a metering step.

However, in order to fix the linear motion portion of the ball screw mechanism, for example, a nut body to the linear motion block mounted with the metering built-in type motor, it is necessary to provide a swelling portion or the like along the screw shaft in the linear motion block. As a result, a portion protruding from the metering built-in type motor is inevitably provided in the linear motion block so as to hinder the request for shortening the entire length of the machine (injection molding machine).

The present invention was developed in consideration of the aforementioned problem. An object of the invention is to provide an injection molding machine using a built-in type motor as a metering electric servomotor, in which the entire length of the machine (injection molding machine) can be shortened.

Means for Solving the Problem

In order to attain the aforementioned object, the invention provides an in-line screw type injection molding machine in which a screw in a heating cylinder is rotated to move a raw resin toward a forward end of the screw while kneading and plasticizing the raw resin, accumulate the thus molten resin on the forward end side of the screw after measurement of the molten resin, and move the screw forward to thereby inject and fill the molten resin into a mold. In the injection molding machine, an internally hollow built-in type motor having a cylindrical stator and a cylindrical rotor located inside the stator is used as a metering electric motor, a sleeve is fixed to the inside of the rotor of the built-in type motor, and a member to which a rear end portion of the screw is fixed is connected and fixed to the sleeve, while a nut body as a linear motion portion of a ball screw mechanism for converting rotation of an injecting electric motor into linear motion is connected and fixed to the sleeve.

EFFECT OF THE INVENTION

According to the present invention, a built-in type motor (metering built-in motor) is used as a metering electric servomotor, a sleeve is fixed to the inside of a rotor of the built-in type motor, and a member (rotary connector) to which a rear end portion of a screw is fixed is connected and fixed to the sleeve, while a nut body as a linear motion portion of a ball screw mechanism for converting rotation of an injecting electric motor into linear motion is connected and fixed to the sleeve. That is, the nut body of the ball screw mechanism is connected to the sleeve integrated with the rotor of the metering built-in motor. It is therefore possible to miniaturize a linear motion block mounted with the metering built-in motor. In addition, the inside of the sleeve (the inside of the rotor of the metering built-in motor) can be effectively used as a space to mount the member (rotary connector) to which the rear end portion of the screw is fixed, and a space to be entered by a screw shaft screwed to the nut body. This configuration can contribute to reduction in the entire length of the machine (injection molding machine). In addition, mounting is so simple that the member (rotary connector) to which the rear end portion of the screw is fixed and the nut body of the ball screw mechanism are fixed to the sleeve fixed to the rotor of the metering built-in motor. Due to such simple mounting, the injection molding machine is also superior in mounting workability.

According to the present invention, however, the rotor of the metering built-in motor and the nut body of the ball screw mechanism (the linear motion portion of the ball screw mechanism) are integrated. Therefore, when the screw rotates due to rotation of the metering built-in motor, the nut body of the ball screw mechanism also rotates. Due to the rotation of the nut body caused by the rotation and drive of the screw, the nut body moves linearly along the screw shaft. Therefore, in the metering step, rotation of the metering built-in motor is controlled while rotation of the injecting electric motor is controlled to cancel the linear motion of the nut body caused by the rotation of the nut body due to the rotation and drive of the screw.

BEST MODE FOR CARRYING OUT THE INVENTION

An embodiment of the present invention will be described below with reference to the drawings.

FIGS. 1 to 5 relate to an in-line screw type injection molding machine of an electrically driven type according to the embodiment of the invention (hereinafter referred to as this embodiment). FIG. 1 is a main portion sectional view showing the outline of an injection system mechanism of the injection molding machine according to this embodiment.

In FIG. 1, the reference numeral 1 represents a head stock disposed on a not-shown injection unit base plate; 2, a holding plate disposed on the not-shown injection unit base plate so as to be opposed to the head stock 1 at a predetermined distance therefrom; 3, a heating cylinder whose rear end portion is fixed to the head stock 1; 4, a nozzle attached to a front end of the heating cylinder 3; 5, a band heater wound around an outer circumference of the heating cylinder 3; 6, a screw disposed in the heating cylinder 3 to be able to rotate and move forward/backward; and 1a and 3a, raw resin supply holes provided in the head stock 1 and the heating cylinder 3 respectively so that a raw resin dropping down and supplied from a not-shown hopper can be supplied into the rear end portion of the heating cylinder 3.

In addition, the reference numeral 7 represents a connector bar extended between the head stock 1 and the holding plate 2; 8, a linear motion block (linear motion body) provided on a not-shown rail member with interposition of a linear motion guide, so as to be able to move forward/backward between the head stock 1 and the holding plate 2; 9, an internally hollow metering built-in type motor (hereinafter referred to as "metering built-in motor 9") mounted on the linear motion block 8; 10, a casing of the metering built-in motor 9; 11, a cylindrical stator of the metering built-in motor 9, which is fixed to the casing 10; 12, a cylindrical rotor of the metering built-in motor 9, which can rotate inside the stator 11; 13, a sleeve fixed to an inner circumferential surface of the rotor 12 by strong fitting or the like; 14, a bearing put between the casing 10 and the sleeve 13 so as to support the sleeve 13 rotatably; and 15, a rotary connector fixing a base end portion of the screw 6 and fixed to the sleeve 13.

In addition, the reference numeral 16 represents an internally hollow injecting built-in type motor (hereinafter referred to as injecting built-in motor 16) mounted on the holding plate 2; 17, a casing of the injecting built-in motor 16 which is fixed to the casing 17; 18, a cylindrical stator of the injecting built-in motor 16; 19, a cylindrical rotor of the injecting built-in motor 16, which can rotate inside the stator 18; and 20, a sleeve fixed on an inner circumferential surface of the rotor 19 by strong fitting or the like. Though depicted simply in FIG. 1, the sleeve 20 is designed to be held rotatably in the casing 17 with a not-shown bearing interposed therebetween.

In addition, the reference numeral 21 represents a ball screw mechanism for converting rotation of the injecting built-in motor 16 into linear motion; 22, a screw shaft of the ball screw mechanism 21 (a rotary portion of the ball screw mechanism 21) held rotatably on the holding plate 2 with a bearing 24 interposed therebetween; 23, a nut body of the ball screw mechanism 21 (a linear motion portion of the ball screw mechanism 21) which is screwed to the screw shaft 22 to make linear motion along the screw shaft 22 due to rotation of the screw shaft 22 and whose end portion is fixed to the sleeve 13 of the metering built-in motor 9 side directly or through a suitable member; and 25, a connector for connecting and fixing the sleeve 20 of the injecting built-in motor 16 side and an end portion of the screw shaft 22.

In this embodiment, the screw lead of the screw shaft 22 of the ball screw mechanism 21 driven and rotated directly by the rotor 19 of the injecting built-in motor 16 is set to be 1.5 or more times as long as the diameter of the screw 6. As a result, even in a configuration where the rotary portion of the ball screw mechanism 21 used for injecting is driven directly by a motor, the injection performance can be secured sufficiently.

FIG. 2 is a main portion enlarged view showing a connecting/fixing portion between the sleeve 20 of the injecting built-in motor 16 side and the end portion of the screw shaft 22 of the ball screw mechanism 21. As shown in FIG. 2, the connector 25 is put between an inner circumferential surface of the sleeve 20 and an outer circumferential surface of the end portion of the screw shaft 22. An undermentioned outer race 26 of the connector 25 is brought into pressure contact with the inner circumferential surface of the sleeve 20, while an undermentioned inner race 27 of the connector 25 is brought into pressure contact with the outer circumferential surface of the end portion of the screw shaft 22. Thus, the sleeve 20 and the screw shaft 22 are firmly fixed and integrated by the connector 25. The operation of adjusting the pressure contact of the connector 25 can be performed easily and surely by the operation of rotating each undermentioned adjustment screw 30 of the connector 25. The operation of rotating the adjustment screw 30 is performed from a free end side of the hollow portion of the injecting built-in motor 16. Thus, the hollow portion of the injecting built-in motor 16 can be effectively used to improve the space factor, while the connection and fixation between the rotor 19 of the injecting built-in motor 16 and a member (the screw shaft 22 of the ball screw mechanism 21 in this case) to be driven and rotated by the rotor 19 can be performed easily and surely with good operationality.

In addition, in this embodiment, as described above, a built-in type motor (the injecting built-in motor 16) is used as the injecting motor for driving and rotating the screw shaft 22 of the ball screw mechanism 21, and the rotor 19 of the injecting built-in motor 16 and the screw shaft 22 are integrated without using a rotation transmitting mechanism of pulleys and a belt so that the injecting built-in motor 16 can directly drive the screw shaft 22 of the ball screw mechanism 21. Thus, the rotational inertia of the rotation transmitting system used for injecting can be reduced so that the transient response performance of rotation transmission can be improved. In addition, a reduction mechanism can be eliminated from the rotation transmitting system used for injecting. Thus, the number of parts can be reduced. In addition thereto, a motor with low-rotation-speed and high-torque specifications can be used as the injecting built-in motor 16, and the transient response performance of rotation transmission in the rotation transmitting system used for injecting can be improved. Thus, it is possible to obtain good forward starting characteristic of the screw 6 at an initial stage of injection (primary injection).

FIG. 3 is a view showing a sectional structure of the connector 25. The connector 25 is a kind of friction type fastener. The connector 25 is a tool for fixing and integrating the shaft outer circumference and the cylinder inner circumference. The connector 25 is a tool which can firmly connect the shaft outer circumference and the cylinder inner circumference without applying any processing to the shaft outer circumference and the cylinder inner circumference. The connector 25 can simplify the structure for the connection and fixation. The connector 25 is constituted by an outer race (outer ring portion) 26 which has a tapered portion on its inner circumferential surface side and which can be displaced radially, an inner race (inner ring portion) 27 which has a tapered portion on its outer circumferential surface side and which can be displaced radially, a first tapering 28 and a second tapering 29 which are located between the outer race 26 and the inner race 27 and which can move axially (in the left/right direction in FIG. 3), and a plurality of fastening bolts 30 which move the first tapering 28 and the second tapering 29 axially. For the first tapering 28, the fastening bolts 30 are screwed to threaded holes formed in the first tapering 28, respectively. For the second tapering 29, the fastening bolts 30 are loosely inserted into clearance holes formed in the second tapering 29, respectively, and the head portions of the fastening bolts 30 abut against the second tapering 29.

When each fastening bolt 30 is rotated in a predetermined direction in the configuration shown in FIG. 3, the first tapering 28 moves in the illustrated right direction, while the second tapering 29 moves in the illustrated left direction. As a result, the outer race 26 is deformed to expand while the inner race 27 is deformed to narrow. Thus, the outer face 26 is brought into pressure contact with the inner circumferential surface of the sleeve 20, and the inner race 27 is brought into pressure contact with the outer circumferential surface of the end portion of the screw shaft 22.

FIG. 4 is a main portion enlarged view showing the connecting/fixing portion among the sleeve 13 of the metering built-in motor 9 side, the rotary connector 15 fixing and holding the base end portion of the screw 6, and the nut body 23 of the ball screw mechanism 21. As shown in FIG. 4, the nut body 23 of the ball screw mechanism 21 is fixed to the sleeve 13 by an attaching bolt 31. Thus, the mounting structure on the nut body 23 side for motion transmission of the ball screw mechanism 21 can be extremely simplified, and assembly thereof also becomes easy.

In addition, as shown in FIG. 4, the rotary connector 15 fixing and holding the base end portion of the screw 6 is fitted into the sleeve 13, and the rotary connector 15 is fixed to the sleeve 13 by an attaching bolt 32. In this embodiment, as described above, a built-in type motor (the metering built-in motor 9) is used as the metering motor for driving and rotating the screw 6. Thus, the sleeve 13 is fixed to the inside of the rotor 12 of the metering built-in motor 9, the rotary connector 15 to which the rear end portion of the screw 6 is fixed is connected and fixed to the sleeve 13, and the nut body 23 serving as the linear motion portion of the ball screw mechanism 21 for converting the rotation of the injecting built-in motor 16 into linear motion is connected and fixed to the sleeve 13. That is, the nut body 23 of the ball screw mechanism 21 is connected to the sleeve 13 integrated with the rotor 12 of the metering built-in motor 9. It is therefore possible to miniaturize the linear motion block 8 mounted with the metering built-in motor 9. In addition, the inside of the sleeve 13 (the inside of the rotor 12 of the metering built-in motor 9) can be effectively used as a space to mount the rotary connector 15, and a space to be entered by the screw shaft 22 screwed to the nut body 23. This configuration can contribute to reduction in the entire length of the machine (injection molding machine). Further, in this embodiment, a built-in type motor (the metering built-in motor 9) is used as the metering motor for driving and rotating the screw 6, and the rotor 12 of the metering built-in motor 9 and the screw 6 are integrated without using a rotation transmitting mechanism of pulleys and a belt so that the metering built-in motor 9 can directly drive the screw 6. Thus, the rotational inertia of the rotation transmitting system used for metering can be reduced so that the transient response performance of rotation transmission can be improved. In addition, a reduction mechanism can be eliminated from the rotation transmitting system used for metering. Thus, the number of parts can be reduced. In addition thereto, a motor with low-rotation-speed and high-torque specifications can be used as the metering built-in motor 9, and the transient response performance of rotation transmission in the rotation transmitting system used for metering can be improved. Thus, it is possible to obtain good rotation starting characteristic of the screw 6 at an initial stage of metering. Even when a high-viscosity resin material is used, stable rotation of the screw 6 can be obtained in an early stage so as to contribute to molding of a good product. Furthermore, the nut body 23 and the rotary connector 15 can be fixed to the sleeve 13 in an extremely simple manner using the attaching bolts 31 and 32. Thus, the injection molding machine is also excellent in mounting workability.

In this embodiment, in a metering step, the metering built-in motor 9 is controlled and driven by rotational velocity (number of revolutions) feedback control through an undermentioned servo driver 45-1 in accordance with an instruction from an undermentioned system controller 41 which administers control of the machine (injection molding machine) as a whole. Thus, the screw 6 rotates in a predetermined direction integrally with the sleeve 13 and the rotary connector 15. In a typical metering operation, a raw resin supplied from a not-shown hopper to the rear end side of the screw 6 through the raw resin supply holes 1$a$ and 3$a$ is kneaded and plasticized due to the rotation of the screw 6 while being moved forward by the screw feed operation of the screw 6. In this embodiment, when the screw 6 rotates in a predetermined direction, the nut body 23 fixed to the sleeve 13 also rotates. Due to the rotation of the nut body 23 caused by the rotation and drive of the screw 6, the nut body 23 makes linear motion along the screw shaft 22. Therefore, in order to cancel the linear motion of the nut body 23 (linear motion of the metering built-in motor 9 or the screw 6) caused by the rotation of the nut body 23 due to the rotation and drive of the screw 6, the system controller 41 controls and drives the injecting built-in motor 16 through an undermentioned servo driver 45-2 by a pressure feedback control using a set back pressure as an intended value. Thus, the back pressure applied to the screw 6 is kept at a predetermined pressure, while the screw 6 is moved backward by proper control as the resin molten thus is fed to the front end side of the screw 6. That is, for example, when the metering built-in motor 9 is rotated at 10 revolutions per unit time, the injecting built-in motor 16 is rotated at 9.9 revolutions per unit time. By such control, the linear motion of the nut 23 caused by the rotation of the nut body 23 due to the rotation and drive of the screw 6 can be canceled while predetermined back pressure can applied to the screw 6. Then, as soon as one shot of the molten resin is accumulated on the front end side of the screw 6, the rotation and drive of the screw 6 by the metering built-in motor 9 is suspended.

On the other hand, in an injecting and filling step, at a suitable timing after metering has been completed, the injecting built-in motor 16 is controlled and driven by speed feedback control through the undermentioned servo driver 45-2 in accordance with an instruction from the undermentioned system controller 41. Thus, the rotation of the injecting built-in motor 16 is converted into linear motion by the ball screw mechanism 21. The linear motion is transmitted to the screw 6 through the aforementioned linear motion transmitting system to drive the screw 6 forward rapidly. Thus, the molten resin accumulated on the front end side of the screw 6 is injected and filled into a cavity of a not-shown mold which has been clamped so that a primary injection step is carried out. In a pressure holding step following the primary injection step, the injecting built-in motor 16 is controlled and driven by pressure feedback control through the servo driver 45-2 in accordance with an instruction from the system controller 41. Thus, a set holding pressure is applied from the screw 6 to the resin in the not-shown mold.

FIG. 5 is a block diagram showing a simplified configuration of a control system of the injection molding machine according to this embodiment. In FIG. 5, the reference numeral 41 represents a system controller which administers control of the machine (injection molding machine) as a whole; 42, an input unit by which an operator performs various input operations; 43, a display unit for displaying images to the operator in various display modes; 44, a sensor group consisting of a large number of sensors (position sensors, speed sensors, pressure sensors, rotation amount sensors, temperature sensors, etc.) disposed in portions of the machine; and 45, a driver group consisting of a large number of drivers (motor drivers, heater drivers, etc.) for controlling and driving actuators (motors including the aforementioned motors 9 and 16), heaters, etc. disposed in portions of the machine. The driver group 45 includes the servo driver 45-1 for driving the metering built-in motor 9 by feedback control, and the servo driver 45-2 for driving the injecting built-in motor 16 by feedback control.

In addition, in the system controller 41, the reference numeral 46 represents an operating condition setting storage portion; 47, a measured value storage portion; 48, an operating process control portion; and 49, a display processing portion.

Operating control conditions of steps (steps of mold closing (mold clamping), injecting, metering, mold opening, forward ejecting, and backward ejecting) of a molding cycle inputted in advance are stored rewritably in the operating condition setting storage portion 46. Metering information (position information, speed information, pressure information, rotation angle information, rotation velocity (number of revolutions per unit time) information, temperature information, etc.) of portions of the machine are imported from the sensor group 44 or the like in real time and stored in the measured value storage portion 47. The operating process control portion 48 controls and drives the driver group 45 to execute operations of the steps, based on operation control programs provided in advance for the steps and set values of operating conditions of the steps stored in the operating condition setting storage portion 46 and with reference to the metering information in the measured value storage portion 47, status confirmation information from each portion or its own clocking information. The display processing portion 49 generates images in various display modes and displays the images on the display unit 43, based on display processing programs provided in advance and fixed data for display and, if necessary, with reference to the contents of the operating condition setting storage portion 46 or the measured value storage portion 47.

DESCRIPTION OF REFERENCE NUMERALS AND SIGNS

Figure 1:
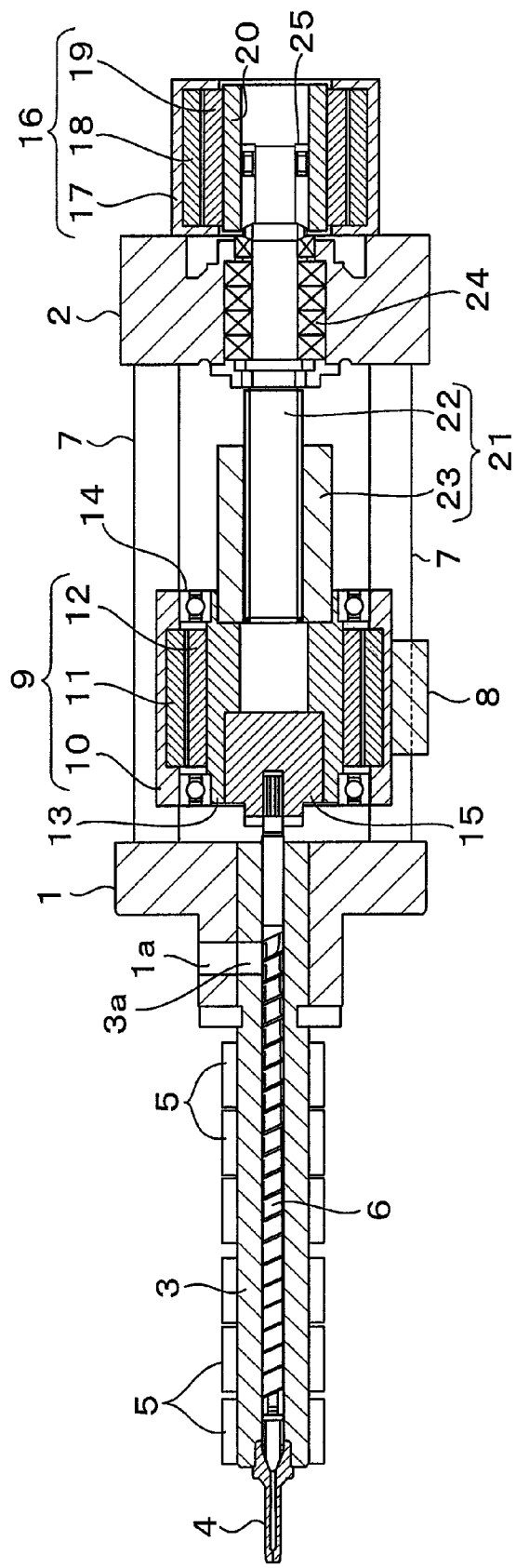
[FIG. 1] A main portion sectional view showing the outline of an injection system mechanism of an injection molding machine according to an embodiment of the invention.
Figure 2:
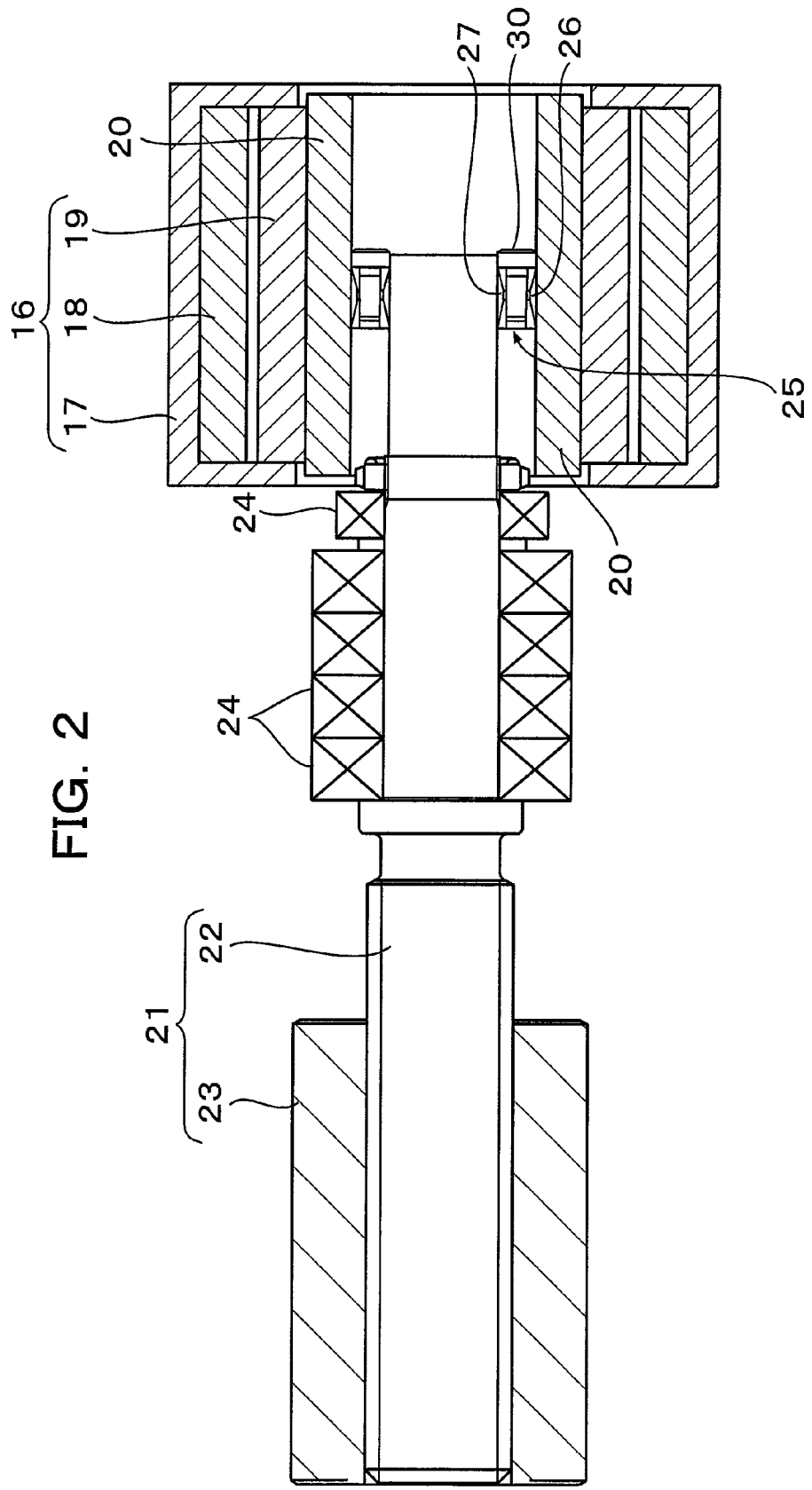
[FIG. 2] A main portion enlarged view showing a connecting/fixing portion between a sleeve of an injecting built-in motor side and an end portion of a screw shaft of a ball screw mechanism in the injection molding machine according to the embodiment of the invention.
Figure 3:
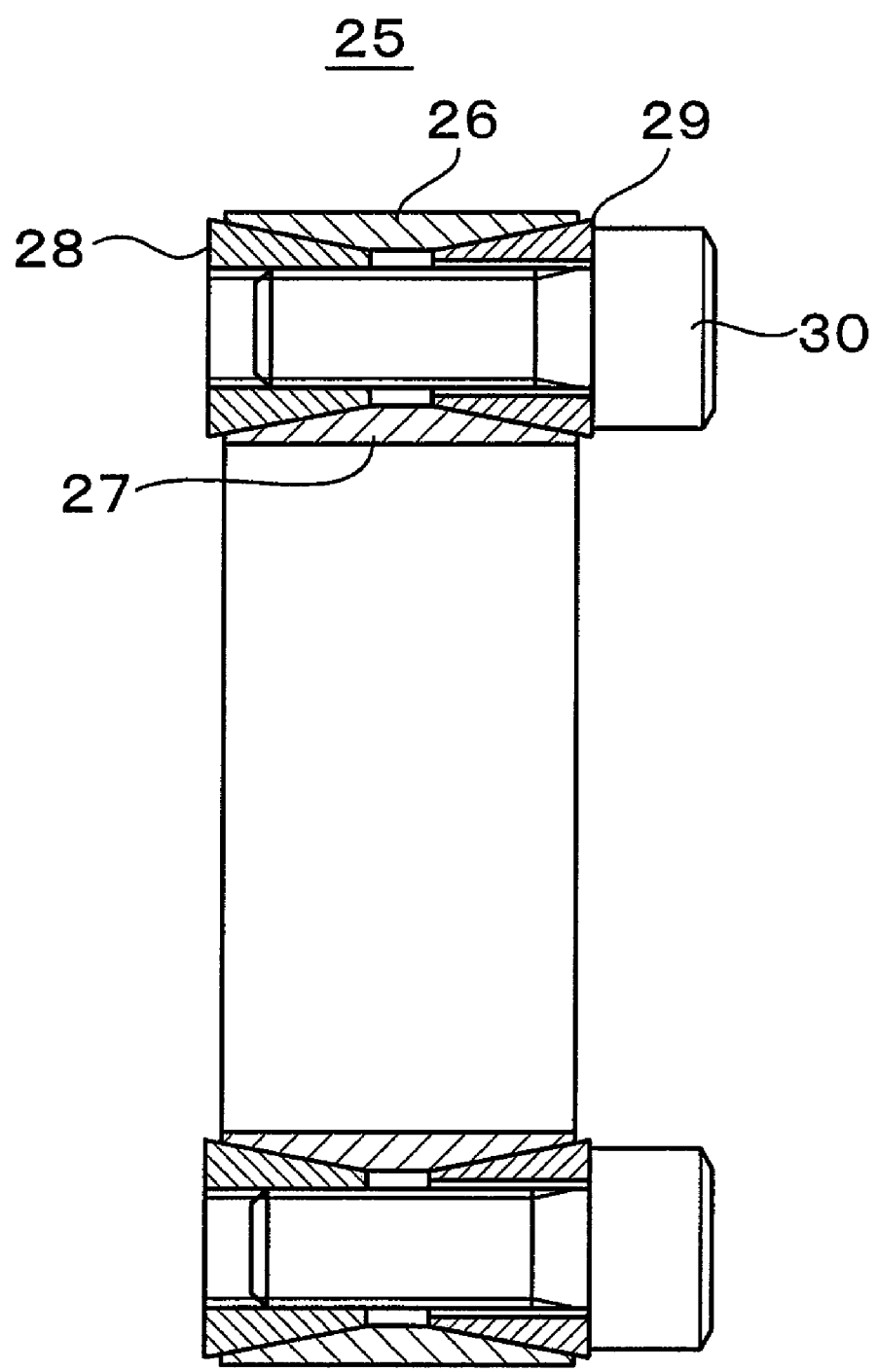
[FIG. 3] An enlarged sectional view of a connector in FIG. 2.
Figure 4:
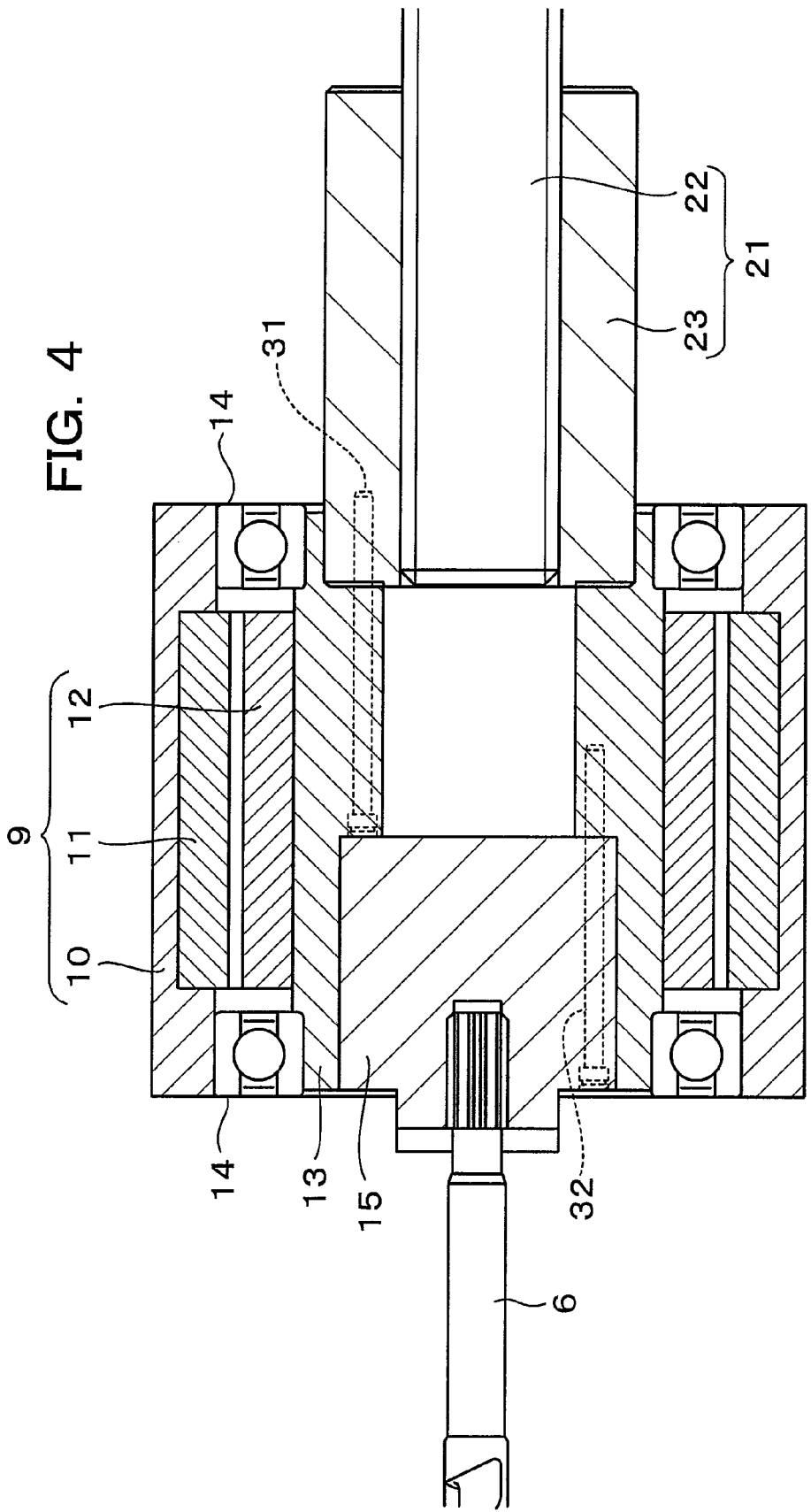
[FIG. 4] A main portion enlarged view showing a connecting/fixing portion among a sleeve of a metering built-in motor side, a rotary connector fixing and holding a base end portion of a screw, and a nut body of the ball screw mechanism in the injection molding machine according to the embodiment of the invention.
Figure 5:
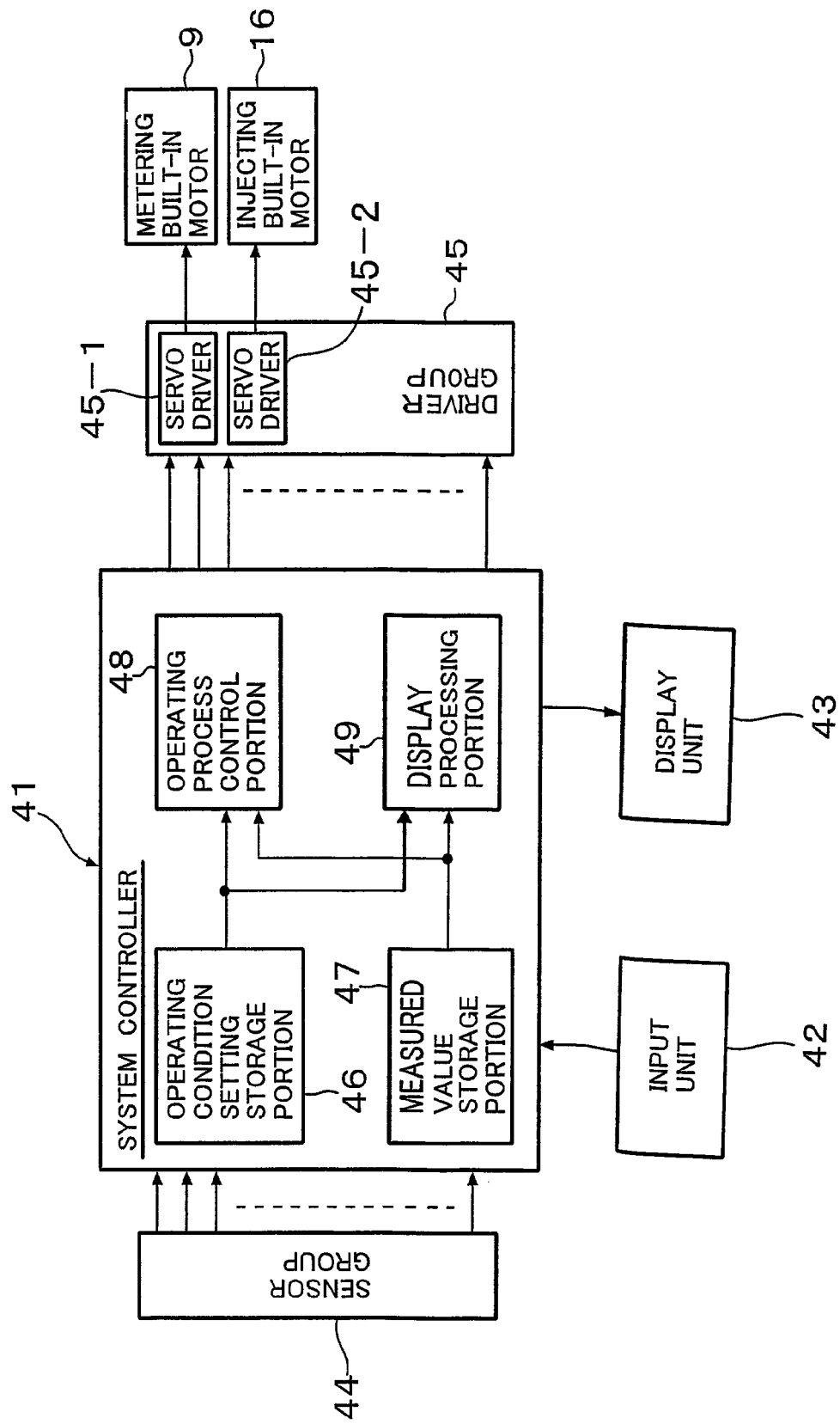
[FIG. 5] A block diagram showing a simplified configuration of a control system of the injection molding machine according to the embodiment of the invention.

1 head stock
1a raw resin supply hole
2 holding plate
3 heating cylinder
3a raw resin supply hole
4 nozzle
5 band heater
6 screw
7 connector bar
8 linear motion block
9 metering built-in type motor (metering built-in motor)
10 casing
11 stator 12 rotor
13 sleeve
14 bearing
15 rotary connector
16 injecting built-in type motor(injecting built-in motor)
17 casing
18 stator
19 rotor
20 sleeve
21 ball screw mechanism
22 screw shaft (rotary portion of ball screw mechanism)
23 nut body (linear motion portion of ball screw mechanism)
24 bearing
25 connector
26 outer race
27 inner race
28 first tapering
29 second tapering
30 fastening bolt
31 attaching bolt
32 attaching bolt
41 system controller
42 input unit
43 display unit
44 sensor group
45 driver group
45-1 servo driver (for metering)
45-2 servo driver (for injecting)
46 operating condition setting storage portion
47 measured value storage portion
48 operating process control portion
49 display processing portion

The invention claimed is:

1. An in-line screw injection molding machine in which a screw in a heating cylinder is rotated to move a raw resin toward a forward end of the screw while kneading and plasticizing the raw resin, accumulate the thus molten resin on the forward end side of the screw after measurement of the molten resin, and move the screw forward to thereby inject and fill the molten resin into a mold, wherein:

an internally hollow built-in motor having a cylindrical stator and a cylindrical rotor located inside the stator is used as a metering electric motor, a sleeve is fixed to the inside of the rotor of the built-in motor, and a member to which a rear end portion of the screw is fixed is connected and fixed by a first bolt to the sleeve, while a nut body as a linear motion portion of a ball screw mechanism for converting rotation of an injecting electric motor into linear motion is connected and fixed with a second bolt to the sleeve.

2. An injection molding machine according to claim 1, further comprising:

a controller which controls rotation of the metering electric motor consisting of the built-in motor in a metering step while controlling rotation of the injecting electric motor so as to cancel linear motion of the nut body caused due to rotation of the nut body caused by rotation and drive of the screw.

3. An injection molding machine according to claim 2, wherein the built-in motor is used as the injecting electric motor, a sleeve fixed to the inside of a rotor of the built-in motor as the injecting electric motor is connected and fixed to a screw shaft as a rotary portion of the ball screw mechanism, and a screw lead of the screw shaft is set to be 1.5 or more times as long as a diameter of the screw.

* * * * *